United States Patent [19]
Suzuki et al.

[11] Patent Number: 6,159,897
[45] Date of Patent: *Dec. 12, 2000

[54] CATALYST FOR PURIFYING EXHAUST GASES

[75] Inventors: Hiromasa Suzuki, Kasugai; Shinichi Matsumoto, Aichi-gun; Naoto Miyoshi, Nagoya; Kazunobu Ishibashi, Toyota; Koichi Kasahara, Ogasa-gun; Syuji Tateishi, Ogasa-gun; Daisuke Suzuki, Ogasa-gun, all of Japan

[73] Assignee: Toyota Jidosha Kabushiki Kaisha and Cataler Industrial Co., Ltd., Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/201,124

[22] Filed: Nov. 30, 1998

Related U.S. Application Data

[63] Continuation of application No. 08/789,988, Jan. 28, 1997, abandoned, which is a continuation of application No. 08/350,622, Dec. 7, 1994, abandoned.

[30] Foreign Application Priority Data

| Dec. 7, 1993 | [JP] | Japan | 5-306775 |
| Aug. 3, 1994 | [JP] | Japan | 6-182552 |
| Nov. 25, 1994 | [JP] | Japan | 6-291780 |

[51] Int. Cl.[7] ............... B01J 21/06; B01J 21/12; B01J 23/02; B01J 23/10; B01J 23/40
[52] U.S. Cl. ............ 502/351; 502/302; 502/303; 502/304; 502/327; 502/328; 502/332; 502/333; 502/334; 502/341; 502/346; 502/351; 502/411
[58] Field of Search ............... 502/302, 303, 502/304, 327, 328, 332, 333, 341, 346, 351, 411

[56] References Cited

U.S. PATENT DOCUMENTS

| 4,157,316 | 6/1979 | Thompson et al. | 502/304 |
| 4,220,559 | 9/1980 | Polinski | 252/455 R |
| 4,440,874 | 4/1984 | Thompson | 502/327 |
| 4,791,091 | 12/1988 | Bricker et al. | 502/303 |
| 4,919,902 | 4/1990 | Bricker et al. | 423/213.5 |
| 5,575,983 | 11/1996 | Suzuki et al. | 423/213.5 |

FOREIGN PATENT DOCUMENTS

| 0 372 156 | 6/1990 | European Pat. Off. . |
| 0 485 180 | 5/1992 | European Pat. Off. . |
| 0 507 590 | 10/1992 | European Pat. Off. . |
| 0 558 159 | 9/1993 | European Pat. Off. . |
| 0 562 516 | 9/1993 | European Pat. Off. . |
| 0 613 714 | 9/1994 | European Pat. Off. . |
| 5-168860 | 7/1993 | Japan . |
| 5-317652 | 12/1993 | Japan . |
| 6-31139 | 2/1994 | Japan . |

Primary Examiner—Walter D. Griffin
Attorney, Agent, or Firm—Oliff & Berridge, PLC

[57] ABSTRACT

A catalyst for purifying exhaust gases includes a support including at least one composite selected from the group consisting of $TiO_2$—$Al_2O_3$, $ZrO_2$—$Al_2O_3$ and $SiO_2$—$Al_2O_3$ composites, an $NO_x$ adsorbent including at least one member selected from the group consisting of alkali metals, alkaline-earth metals and rare-earth elements and loaded on the support, and a noble metal catalyst ingredient loaded on the support. The composites constituting the support improve initial $NO_x$ conversion of the catalyst, but also inhibit $NO_x$ purifying performance thereof from degrading even after a durability test.

49 Claims, No Drawings

CATALYST FOR PURIFYING EXHAUST GASES

BACKGROUND OF THE INVENTION

This is a continuation of application Ser. No. 08/789,988 filed Jan. 28, 1997, now abandoned which in turn is a continuation of U.S. application Ser. No. 08/350,622 filed Dec. 7, 1994, now abandoned. The entire disclosure of the prior application(s) is hereby incorporated by reference herein in its entirety.

FIELD OF THE INVENTION

The present invention relates to a catalyst for purifying exhaust gases. More particularly, it relates to the catalyst which can efficiently purify nitrogen oxides ($NO_x$) in the exhaust gases whose oxygen concentrations are at the stoichiometric point or more than required for oxidizing carbon monoxide (CO) and hydrocarbons (HC) therein.

Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal catalyst ingredient selected from the group consisting of Pt, Pd and Rh and loaded on the catalyst carrier layer.

The purifying performance of the 3-way catalysts for purifying exhaust gases depends greatly on the air-fuel ratio A/F of automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly; the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in the oxygen-rich atmospheres).

In view of the aforementioned circumstances, the applicants et al. of the present invention proposed a novel catalyst in Japanese Unexamined Patent Publication (KOKAI) No. 5-317,652. This catalyst comprises an alkaline-earth metal oxide and Pt which are loaded on its porous support- In the catalyst, during the fuel-lean side (i.e., in the oxygen-rich atmospheres) driving, $NO_x$ is adsorbed on the alkaline-earth metal elements, and it reacts with the reducing gas such as HC and the like to be purified. As a result, the catalyst exhibits superb $NO_x$ purifying performance during the fuel-lean side (i.e., in the oxygen-rich atmospheres) driving.

The catalyst proposed in Japanese Unexamined Patent Publication (KOKAI) No. 5-317,652 is believed to provide the advantageous effect as follows: the alkaline-earth metals are loaded on the support in the form of their simple oxides, for example, barium oxide, and they react with $NO_x$ to produce nitrates, e.g., $Ba(NO)_3$. Thus, $NO_x$ is adsorbed on the support of the catalyst in the form of the alkaline-earth metal nitrates.

In addition, as set forth in Japanese Unexamined Patent Publication (KOKAI) Nos. 5-168,860 and 6-31,139, exhaust-gases-purifying catalysts have been known in which an $NO_x$ adsorbent and Pt or the like are loaded on a heat resistant inorganic oxide. The $NO_x$ adsorbent includes barium representing alkaline-earth metals, or lanthanum representing rare-earth elements. The heat resistant inorganic oxide includes zeolite, alumina or the like.

However, the exhaust gases usually contain SOX which is produced by burning sulfur (S) contained in the fuel. Further, the catalyst ingredient oxidizes $SO_x$ to $SO_3$ in the oxygen-rich atmospheres (i.e., on the fuel-lean side). Still further, $SO_3$ reacts readily with water vapor also contained in the exhaust gases to produce sulfuric acid. It has been revealed that the resulting sulfuric acid reacts with the alkaline-earth metal elements to produce alkaline-earth metal sulfites and alkaline-earth metal sulfates, thereby poisoning the alkaline-earth metal elements (i.e., $NO_x$ adsorbent). Moreover, the porous support made of alumina, etc., is likely to adsorb $SO_x$, thereby facilitating the poisoning.

Specifically, when the $NO_x$ adsorbent, such as alkaline-earth metal elements, is turned into the sulfites and sulfates, it hardly adsorbs NO[] thereon. As a result, the catalyst proposed in Japanese Unexamined Patent Publication (KOKAI) No. 5-317,652 might suffer from a drawback in that it is deteriorated in terms of the $NO_x$ purifying performance after it is subjected to a durability test.

In addition, titania ($TiO_2$) does not adsorb $SO_x$ thereon. Hence, the inventors of the present invention thought of employing a support made of titania, and carried out a series of experiments. As a result, they found that, in a catalyst comprising a titania support, $SO_x$ is not adsorbed but flows as it is to a downstream side, and that only the $SO_x$ which contacts directly with a noble metal catalyst ingredient is oxidized. Thus, they revealed that the poisoning develops less. However, they also discovered that the catalyst comprising the titania support has a detrimental characteristic in that it exhibits low initial purifying activity and keeps low $NO_x$ purifying performance after a durability test.

SUMMARY OF THE INVENTION

The present invention has been developed in view of the aforementioned circumstances. It is therefore an object of the present invention to provide a catalyst which can not only exhibit satisfactory initial $NO_x$ conversion securely but also can exhibit its $NO_x$ purifying performance even after a durability test.

In accordance with a first aspect of the present invention, a catalyst can solve the aforementioned problems. A catalyst according to the first aspect of the present invention comprises:

a support including at least one composite selected from the group consisting of $TiO_2$—$Al_2O_3$, $ZrO_2$—$Al_2O_3$ and $SiO_2$—$Al_2O_3$ composites;

an $NO_x$ adsorbent including at least one member selected from the group consisting of alkali metals, alkaline-earth metals and rare-earth elements, and loaded on the support; and a noble metal catalyst ingredient loaded on the support.

In accordance with a second aspect of the present invention, a catalyst can also solve the aforementioned problems. A catalyst according to the second aspect of the present invention comprises:

a composite support including $TiO_2$, $Al_2O_3$, and at least one element selected from the group consisting of alkaline-earth metals and rare-earth elements;

an $NO_x$ adsorbent including at least one member selected from the group consisting of alkali metals, alkaline-earth metals and rare-earth elements, and loaded on the composite support; and a noble metal catalyst ingredient loaded on the composite support.

Unless otherwise specified, the term, "rare-earth elements," herein includes not only the chemical elements with atomic numbers 58 through 71, but also $_{21}Sc$, $_{39}Y$ and $_{57}La$.

In the catalyst according to the first aspect of the present invention, the support is employed which includes at least one composite selected from the group consisting of $TiO_2$—$Al_2O_3$, $ZrO_2$—$Al_2O_3$ and $SiO_2$—$Al_2O_3$ composites. This arrangement apparently enables to effect advantages of $TiO_2$, $ZrO_2$, $SiO_2$ and $Al_2O_3$ only, though reasons behind the advantageous operation is still under investigation.

Specifically, the advantages of $Al_2O_3$ enhance initial $NO_x$ conversion. Compared with $Al_2O_3$, $TiO_2$, $ZrO_2$ and $SiO_2$ are less likely to adsorb $SO_x$. Even when they adsorb $SO_x$, they are more likely to release $SO_x$ at low temperatures than the $NO_x$ adsorbent. Thus, they are inhibited from being poisoned by $SO_x$. As a result, when the present catalyst employs the composites as its support, the present catalyst can exhibit satisfactory initial $NO_x$ conversion securely. Moreover, $SO_x$ is inhibited from adsorbing on the present catalyst, and consequently the present catalyst can exhibit improved $NO_x$ conversion even after a durability test.

Hereinafter, $TiO_2$, $ZrO_2$ and $SiO_2$ employed in the catalyst according to the first aspect of the present invention are collectively referred to as $MO_2$. When amounts of $MO_2$ and $Al_2O_3$ are defined by moles of their metallic components, compositing ratio of $MO_2$ with respect to $Al_2O_3$ (i.e., M/Al expressed in molar ratio) preferably satisfies the following relationship:

M/Al=5/95 through 50/50.

When the compositing ratio M/Al is smaller than 5/95, the resulting catalysts exhibit deteriorated $NO_x$ conversion after a durability test. When the compositing ratio M/Al is larger than 50/50, the resulting catalysts exhibit deteriorated initial $NO_x$ conversion and exhibit poor $NO_x$ conversion, degrading according to the enlarging compositing ratio M/Al, after a durability test. It is especially preferable that the compositing ratio M/Al satisfies the following relationship:

M/Al=20/80 through 30/70.

In addition, it is preferred that $MO_2$ and $Al_2O_3$ are composited at level as small as possible. That is, it is preferable to make $M_2$ and $Al_2O_3$ into composite oxide than to simply mixing them, and it is further preferable to composite them at atomic level. In order to composite them at atomic level, a coprecipitation process, a sol-gel process and the like are available.

In the catalyst according to the second aspect of the present invention, the composite support is employed which includes $TiO_2$, $Al_2O_3$, and at least one element selected from the group consisting of alkaline-earth elements and rare earth elements.

In particular, when a catalyst employs a composite support including $TiO_2$—$Al_2O_3$ composite, it was discovered that $TiO_2$ facilitates to transform $Al_2O_3$ into alpha—$Al_2O_3$ and to deteriorate the resulting catalysts in terms of purifying performance, especially oxidation activity. Further, it was found that $Al_2O_3$ is facilitated to transform into alpha—$Al_2O_3$ according to increasing $TiO_2$ content. However, when a $TiO_2$—$Al_2O_3$ composite is further composited with one of alkaline-earth elements and rare earth elements or with both of them, a catalyst employing a support made of such a composite can be inhibited from degrading in terms of oxidation activity after a durability test and accordingly can exhibit high purifying performance. Reasons behind this advantageous operation is unknown, and is still under investigation.

As for the support or the composite support, it is possible to prepare it in any form, e.g., a honeycomb-formed support made from at least one of the composites, a honeycomb-formed support made from cordierite and coated with at least one of the composites, and a honeycomb-formed support made from heat resistant metal and coated with at least one of the composites.

As for the $NO_x$ adsorbent, it is possible to employ at least one element selected from the group consisting of alkali metals, alkaline-earth metals and rare earth elements. As for the alkali metals, the following elements are available: lithium (Li), sodium (Na), potassium (K), rubidium (Rb), cesium (Cs) and francium (Fr). The term, "alkaline-earth metals," herein means the elements of group 2A in the periodic table of the elements. For instance, the following elements are available: barium (Ba), beryllium (Be), magnesium (Mg), calcium (Ca) and strontium (Sr). As for the rare earth elements, the following elements are available: scandium (So), yttrium (Y), lanthanum (La), cerium (Ce), praseodymium (Pr) and neodymium (Nb).

The loading amount of the $NO_x$ adsorbent preferably falls in a range of from 0.05 to 1.0 mole with respect to 120 grams of the support or the composite support. When it is less than 0.05 moles with respect thereto, the resulting catalysts exhibit small $NO_x$ adsorbing capability and deteriorate in terms of $NO_x$ purifying performance. When it is more than 1.0 mole, not only the advantageous effects resulting from the $NO_x$ adsorbent saturate but also there arise the other problems resulting from the reduced loading amount of the noble metal catalyst ingredient.

As for the noble metal catalyst ingredient, it is possible at least one element selected from the group consisting of Pt, Rh and Pd. When Pt or Pd is loaded, it is preferably loaded in an amount of from 0.1 to 20.0 grams with respect to 120 grams of the support or the composite support, further preferably in an amount of from 0.5 to 10.0 grams with respect thereto. When Rh is loaded, it is preferably loaded in an amount of from 0.01 to 80.0 grams with respect to 120 grams of the support or the composite support, further preferably in an amount of from 0.05 to 5.0 grams with respect thereto. These loading amounts of the noble metal catalyst ingredient can be converted into values with respect to the unit volume (e.g., 1 liter) of the support or the composite support. For example, when Pt or Pd is loaded, it is preferably loaded in an amount of from 0.1 to 20.0 grams with respect to 1 liter of the support or the composite support, further preferably in an amount of from 0.5 to 10.0 grams with respect thereto. When Rh is loaded, it is preferably loaded in an amount of from 0.01 to 80.0 grams with respect to 1 liter of the support or the composite support, further preferably in an amount of from 0.05 to 5.0 grams with respect thereto.

Thus, in accordance with the first aspect of the present invention, the catalyst can securely exhibit satisfactory initial $NO_x$ conversion. Moreover, $SO_x$ is inhibited from adsorbing on the present catalyst, and consequently from poisoning the $NO_x$ adsorbent. As a result, the present catalyst can exhibit improved $NO_x$ conversion which is inhibited from deteriorating even after a durability test.

The second aspect of the present invention operates and provides advantageous effects identically with the first aspect of the present invention. In addition, when a $TiO_2$—$Al_2O_3$ composite is employed to make the support of the present catalyst, the present catalyst can be inhibited from degrading in terms of oxidation activity after a durability test, and accordingly can exhibit highly-maintained CO and HC purifying performance.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Unless otherwise specified, the term, "parts," hereinafter means "parts by weight."

First Preferred Embodiment (Preparation of $TiO_2$—$Al_2O_3$ Composite Powder) 3 liters of 2-propanol was charged into a flask adapted ór synthesizing sol-gel and provided with a reflux, and it was held at 80° C. While stirring the 2-propanol, 1,225 grams of aluminum isopropoxide was charged into the flask to dissolve, and the mixed solution was further stirred at 80° C. for 2 hours.

Thereafter, while stirring the mixed solution at 80° C., 189.6 grams of tetraethyl titanate was dropped into the flask. After dropping all of the tetraethyl titanate, the mixed solution was further kept to be stirred at 80° C. for 2 hours.

Moreover, while stirring the mixed solution at 80° C., a mixed solution containing 432 grams of pure water and 2 liters of 2-propanol was dropped. The dropping rate was adjusted to 20 c.c./min. After dropping, the mixed solution was kept to be stirred at 80° C. for 2 hours.

Finally, after aging the thus mixed solution at room temperature for one day and one night, the water content and the alcohol content were removed from the mixed solution by using a rotary evaporator. After naturally drying the resulting residue, the residue was dried forcibly at 110° C., and it was calcinated at 600° C. for 3 hours. Thus, a $TiO_2$—$Al_2O_3$ composite powder was produced which had a Ti/Al compositing ratio of 9.6/90.4 expressed in molar ratio.

(Noble Metal Catalyst Ingredient Loading)

With respect to 120 grams of the resulting $TiO_2$—$Al_2O_3$ composite powder, a platinum dinitrodiammine aqueous solution was impregnated in a predetermined amount. The composite powder undergoing the impregnation was dried at 110° C., and thereafter it was calcinated at 250° C. for 1 hour. The loading amount of Pt was 2.0 grams with respect to 120 grams of the composite powder.

($NO_x$ Adsorbent Loading)

With respect to the resulting $TiO_2$—$Al_2O_3$ composite powder with Pt loaded, a barium acetate aqueous solution was impregnated in a predetermined amount. The composite powder with Pt loaded undergoing the impregnation was dried at 110° C., and thereafter it was calcinated at 500° C. for 3 hours. The loading amount of Ba was 0.3 moles with respect to 120 grams of the composite powder.

The thus produced composite powder with Pt and Ba loaded was formed into a preform by applying pressure. The preform was then pulverized, thereby preparing pellet-shaped catalysts of the First Preferred Embodiment.

Second Preferred Embodiment

Except that a $TiO_2$—$Al_2O_3$ composite powder was produced which had a Ti/Al compositing ratio of 25/75 expressed in molar ratio, pellet-shaped catalysts of the Second Preferred Embodiment were prepared in the same manner as the First Preferred Embodiment.

Third Preferred Embodiment

Except that a $TiO_2$—$Al_2$ $O_3$ composite powder was produced which had a Ti/Al compositing ratio of 50/50 expressed in molar ratio, pellet-shaped catalysts of the Third Preferred Embodiment were prepared in the same manner as the First Preferred Embodiment.

Fourth Preferred Embodiment

Except that a $TiO_2$—$Al_2O_3$ composite powder was produced which had a Ti/Al compositing ratio of 70/30 expressed in molar ratio, pellet-shaped catalysts of the Fourth Preferred Embodiment were prepared in the same manner as the First Preferred Embodiment.

Fifth Preferred Embodiment

In the Fifth Preferred Embodiment, a $TiO_2$—$Al_2O_3$ composite powder was produced which had a Ti/Al compositing ratio of 25/75 expressed in molar ratio. After loading Pt in the same manner as the First Preferred Embodiment, a sodium acetate aqueous solution, instead of the barium acetate aqueous solution, was impregnated. The composite powder undergoing the impregnation was dried at 110° C., and it was calcinated at 500° C. for 3 hours. The loading amount of Na was 0.3 males with respect to 120 grams of the composite powder.

The thus produced composite powder with Pt and Na loaded was formed into a preform by applying pressure. The preform was then pulverized, thereby preparing pellet-shaped catalysts of the Fifth Preferred Embodiment.

Sixth Preferred Embodiment

Except that a potassium acetate aqueous solution was used instead of the sodium acetate aqueous solution to load K, instead of Na, in a loading amount of 0.3 moles with respect to 120 grams of the composite powder, pellet-shaped catalysts of the Sixth Preferred Embodiment were prepared in the same manner as the Fifth Preferred Embodiment.

Seventh Preferred Embodiment

Except that a cesium nitrate aqueous solution was used instead of the sodium acetate aqueous solution to load Cs, instead of Na, in a loading amount of 0.3 moles with respect to 120 grams of the composite powder, pellet-shaped catalysts of the Seventh Preferred Embodiment were prepared in the same manner as the Fifth Preferred Embodiment.

Comparative Example No. 1

Except that a gamma—$Al_2O_3$ powder was used instead of the $TiO_2$—$Al_2O_3$ composite powder, pellet-shaped catalysts of Comparative Example No. 1 were prepared in the same manner as the First Preferred Embodiment.

Comparative Example No. 2

Except that a $TiO_2$ powder was used instead of the $TiO_2$—$Al_2O_3$ composite powder, pellet-shaped catalysts of Comparative Example No. 2 were prepared in the same manner as the First Preferred Embodiment.

Examination and Evaluation

Each of the pellet-shaped catalysts of the First through Seventh Preferred Embodiments and Comparative Example Nos. 1 and 2 was examined for initial $NO_x$ conversion as well as $NO_x$ conversion after a durability test. The results of this examination are set forth in Table 1 below.

The initial $NO_x$ conversion was examined by using a model gas which simulated an exhaust gas emitted from an automobile engine. Specifically, it was examined when the automobile engine was operated alternately under 2 conditions, namely when the automobile engine was operated alternately at an A/F ratio of 18 for 2 minutes and at an A/F ratio of 14 for 2 minutes.

maximum $NO_x$ conversion after a durability test which exceeded the value exhibited by Comparative Example No. 1 (i.e., the novel catalyst proposed in Japanese Unexamined Patent Publication (KOKAI) No. 5-317,652). Since they did not exhibit maximum in the initial $NO_x$ conversion, it is believed that the maximum value in the $NO_x$ conversion after a durability test is effected, not by simply mixing $TiO_2$ and $Al_2O_3$, but by synergetic effect which results from compositing $TiO_2$ and $Al_2O_3$.

Note that, although the exhaust-gases-purifying catalysts of Comparative Example No. 2 exhibited a small difference between the initial $NO_x$ conversion and the $NO_x$ conversion after a durability test, they exhibited a low initial $NO_x$ conversion and consequently they exhibited a lowered $NO_x$ conversion after a durability test.

TABLE 1

| | Support Composition (Compositing Ratio) | Pt Loading Amount (grams/liter) | NOx Adsorbent Loading (mole/liter) | Initial NOx Conversion (%) | NOx Conversion after Durability Test (%) |
|---|---|---|---|---|---|
| 1st Pref. Embodiment | $TiO_2$—$Al_2O_3$ (Ti/Al = 9.6/90.4) | 2.0 | 0.3 (Ba) | 71 | 39 |
| 2nd Pref. Embodiment | $TiO_2$—$Al_2O_3$ (Ti/Al = 25/75) | 2.0 | 0.3 (Ba) | 62 | 54 |
| 3rd Pref. Embodiment | $TiO_2$—$Al_2O_3$ (Ti/Al = 50/50) | 2.0 | 0.3 (Ba) | 48 | 34 |
| 4th Pref. Embodiment | $TiO_2$—$Al_2O_3$ (Ti/Al = 70/30) | 2.0 | 0.3 (Ba) | 38 | 20 |
| 5th Pref. Embodiment | $TiO_2$—$Al_2O_3$ (Ti/Al = 25/75) | 2.0 | 0.3 (Na) | 72 | 64 |
| 6th Pref. Embodiment | $TiO_2$—$Al_2O_3$ (Ti/Al = 25/75) | 2.0 | 0.3 (K) | 75 | 66 |
| 7th Pref. Embodiment | $TiO_2$—$Al_2O_3$ (Ti/Al = 25/75) | 2.0 | 0.3 (Cs) | 73 | 63 |
| Comp. Ex. No. 1 | gamma-$Al_2O_3$ | 2.0 | 0.3 (Ba) | 80 | 41 |
| Comp. Ex. No. 2 | $TiO_2$ | 2.0 | 0.3 (Ba) | 32 | 30 |

The $NO_x$ conversion after a durability test was examined by using a first model gas which was equivalent to a fuel-air mixture having an A/F ratio of 18 and which had an $SO_2$ concentration of 300 ppm, and by using a second model gas which was equivalent to a fuel-air mixture having an A/F ratio of 14. Specifically, the first model gas was flowed through the pellet-shaped catalysts at 600° C. for 20 hours, and thereafter the second model gas was flowed through them at 600° C. for 1 hour. Each of the thus degraded pellet-shaped catalysts was examined for its $NO_x$ conversion in the same manner as the above-described initial $NO_x$ conversion examination, thereby examining the catalysts for the $NO_x$ conversion after a durability test.

It is understood from Table 1 that, when observing the degradation of the $NO_x$ conversion after a durability test with respect to the initial $NO_x$ conversion, the exhaust-gases-purifying catalysts of the First through Seventh Preferred Embodiment degraded less than those of Comparative Example No. 1 did. Thus, the exhaust-gases-purifying catalysts of the First through Seventh Preferred Embodiments employing the composite supports were apparently improved over those of Comparative Example No. 1 employing the simple alumina support in terms of durability.

In addition, when the Ti/Al compositing ratio was around 25/75, the exhaust-gases-purifying catalysts of the First through Seventh Preferred Embodiments exhibited the Eighth Preferred Embodiment (Preparation of $ZrO_2$—$Al_2O_3$ Composite Powder)

3 liters of 2-propanol was charged into a flask adapted for synthesizing sol-gel and provided with a reflux, and it was held at 80° C. While stirring the 2-propanol, 1,000 grams of aluminum isopropoxide was charged into the flask to dissolve, and the mixed solution was further stirred at 80° C. for 2 hours.

Thereafter, while stirring the mixed solution, 245.3 grams of a zirconium n-butoxide solution having a concentration of 85% by weight was dropped into the flask. After dropping all of the zirconium n-butoxide solution, the mixed solution was further kept to be stirred at 80° C. for 2 hours.

Moreover, while stirring the mixed solution at 80° C., a mixed solution containing 432 grams of pure water and 2 liters of 2-propanol was dropped. The dropping rate was adjusted to 20 c.c./min. After dropping, the mixed solution was kept to be stirred at 80° C. for 2 hours.

Finally, after aging the thus mixed solution at room temperature for one day and one night, the water content and the alcohol content were removed from the mixed solution by using a rotary evaporator. After naturally drying the resulting residue, the residue was dried forcibly at 110° C., and it was calcinated at 600° C. for 3 hours. Thus, a $ZrO_2$—$Al_2O_3$ composite powder was produced which had a Zr/Al compositing ratio of 1/9 expressed in molar ratio.

(Noble Metal Catalyst Ingredient Loading)

With respect to 120 grams of the resulting $ZrO_2$—$Al_2O_3$ composite powder, a platinum dinitrodiammine aqueous solution was impregnated in a predetermined amount. The composite powder undergoing the impregnation was dried at 110° C., and thereafter it was calcinated at 250° C. for 1 hour. The loading amount of Pt was 2.0 grams with respect to 120 grams of the composite powder. Further, a rhodium nitrate aqueous solution was impregnated in a predetermined amount. The composite powder undergoing this second impregnation was dried at 110° C., and thereafter it was calcinated at 250° C. for 1 hour. The loading amount of Rh was 0.1 gram with respect to 120 grams of the composite powder.

($NO_x$ Adsorbent Loading)

With respect to the resulting $ZrO_2$—$Al_2O_3$ composite powder with Pt and Rh loaded, a barium acetate aqueous solution was impregnated in a predetermined amount. The composite powder with Pt and Rh loaded undergoing this impregnation was dried at 110° C., and thereafter it was calcinated at 500° C. for 3 hours. The loading amount of Ba was 0.3 moles with respect to 120 grams of the composite powder.

The thus produced composite powder with Pt, Rh and Ba loaded was formed into a preform by applying pressure. The preform was then pulverized, thereby preparing pellet-shaped catalysts of the Eighth Preferred Embodiment.

Ninth Preferred Embodiment

Except that a $ZrO_2$—$Al_2O_3$ composite powder was produced which had a Zr/Al compositing ratio of 1/3 expressed in molar ratio, pellet-shaped catalysts of the Ninth Preferred Embodiment were prepared in the same manner as the Eighth Preferred Embodiment.

Tenth Preferred Embodiment

Except that a $ZrO_2$—$Al_2O_3$ composite powder was produced which had a Zr/Al compositing ratio of 1/1 expressed in molar ratio, pellet-shaped catalysts of the Tenth Preferred Embodiment were prepared in the same manner as the Eighth Preferred Embodiment.

Eleventh Preferred Embodiment

Except that a $ZrO_2$—$Al_2O_3$ composite powder was produced which had a Zr/Al compositing ratio of 2/1 expressed in molar ratio, pellet-shaped catalysts of the Eleventh Preferred Embodiment were prepared in the same manner as the Eighth Preferred Embodiment.

Twelfth Preferred Embodiment

Except that a $ZrO_2$—$Al_2O_3$ composite powder was produced which had a Zr/Al compositing ratio of 1/1 expressed in molar ratio, and that a potassium acetate aqueous solution, instead of the barium acetate aqueous solution, was impregnated to load K in a loading amount of 0.3 moles with respect to 120 grams of the composite powder, pellet-shaped catalysts of the Twelfth Preferred Embodiment were prepared in the same manner as the Eighth Preferred Embodiment.

Comparative Example No. 3

Except that a gamma—$Al_2O_3$ powder was used instead of the $ZrO_2$—$Al_2O_3$ composite powder, pellet-shaped catalysts of Comparative Example No. 3 were prepared in the same manner as the Eighth Preferred Embodiment.

Comparative Example No. 4

Except that a $ZrO_2$ powder was used instead of the $ZrO_2$—$Al_2O_3$ composite powder, pellet-shaped catalysts of Comparative Example No. 4 were prepared in the same manner as the Eighth Preferred Embodiment.

Comparative Example No. 5

Except that a gamma-$Al_2O_3$ powder was used instead of the $ZrO_2$—$Al_2O_3$ composite powder, and that a potassium acetate aqueous solution, instead of the barium acetate aqueous solution, was impregnated to load K in a loading amount of 0.3 moles with respect to 120 grams of the composite powder, pellet-shaped catalysts of Comparative Example No. 5 were prepared in the same manner as the Eighth Preferred Embodiment.

Examination and Evaluation

Each of the pellet-shaped catalysts of the Eighth through Twelfth Preferred Embodiments and Comparative Example Nos. 3 through 5 was examined for initial $NO_x$ conversion as well as $NO_x$ conversion after a durability test. The results of this examination are set forth in Table 2 below.

The initial $NO_x$ conversion was examined by using a model gas which simulated an exhaust gas emitted from an automobile engine. Specifically, it was examined when the automobile engine was operated alternately under 2 conditions, namely when the automobile engine was operated alternately at an A/F ratio of 18 for 2 minutes and at an A/F ratio of 14 for 2 minutes.

The $NO_x$ conversion after a durability test was measured by using a first model gas which was equivalent to a fuel-air mixture having an A/F ratio of 18 and which had an $SO_2$ concentration of 300 ppm, and by using a second model gas which was equivalent to a fuel-air mixture having an A/F ratio of 14. Specifically, the first model gas was flowed through the pellet-shaped catalysts at 600° C. for 20 hours, and thereafter the second model gas was flowed through them at 600° C. for 1 hour. Each of the thus degraded pellet-shaped catalysts was examined for its $NO_x$ conversion in the same manner as the above-described initial $NO_x$ conversion examination, thereby examining the catalysts for the $NO_x$ conversion after a durability test.

Moreover, a durability ratio R (%) was calculated by the following equation and also recited in Table 2:

Durability Ratio R (%)=

(Conversion after a Durability Test)/(Initial Conversion).

As can be appreciated from Table 2, when the exhaust-gases-purifying catalysts of the Eighth through Twelfth Preferred Embodiments employed the $ZrO_2$—$Al_2O_3$ composite supports, they exhibited initial $NO_x$ conversion lower than those of Comparative Example Nos. 3 and 5. However, they exhibited the durability ratio R which exceeded those of Comparative Example Nos. 3 and 5. Thus, they were apparently improved over those of Comparative Example Nos. 3 through 5 in terms of durability.

In addition, when the Zr/Al compositing ratio was around 1/1, the exhaust-gases-purifying catalysts of the Eighth through Twelfth Preferred Embodiments exhibited their maximum durability.

TABLE 2

| | Support Composition (Compositing Ratio) | Pt Loading Amount (grams/liter) | Rh Loading Amount (grams/liter) | NOx Adsorbent Loading Amount (mole/liter) | Initial NOx Conversion (%) | NOx Conversion after Durability Test (%) | Durability Ratio (%) |
|---|---|---|---|---|---|---|---|
| 8th Pref. Embodiment | $ZrO_2$—$Al_2O_3$ (Zr/Al = 1/9) | 2.0 | 0.1 | 0.3 (Ba) | 78 | 47 | 60.0 |
| 9th Pref. Embodiment | $ZrO_2$—$Al_2O_3$ (Zr/Al = 1/3) | 2.0 | 0.1 | 0.3 (Ba) | 65 | 48 | 73.8 |
| 10th Pref. Embodiment | $ZrO_2$—$Al_2O_3$ (Zr/Al = 1/1) | 2.0 | 0.1 | 0.3 (Ba) | 63 | 53 | 82.5 |
| 11th Pref. Embodiment | $ZrO_2$—$Al_2O_3$ (Zr/Al = 2/1) | 2.0 | 0.1 | 0.3 (Ba) | 52 | 34 | 65.4 |
| 12th Pref. Embodiment | $ZrO_2$—$Al_2O_3$ (Zr/Al = 1/1) | 2.0 | 0.1 | 0.3 (K) | 66 | 54 | 81.8 |
| Comp. Ex. No. 3 | gamma-$Al_2O_3$ | 2.0 | 0.1 | 0.3 (Ba) | 80 | 41 | 51.3 |
| Comp. Ex. No. 4 | $ZrO_2$ | 2.0 | 0.1 | 0.3 (Ba) | 42 | 20 | 47.6 |
| Comp. Ex. No. 5 | gamma-$Al_2O_3$ | 2.0 | 0.1 | 0.3 (K) | 82 | 44 | 53.7 |

Thirteenth Preferred Embodiment (Preparation of $SiO_2$—$Al_2O_3$ Composite Powder)

3 liters of 2-propanol was charged into a flask adapted for synthesizing sol-gel and provided with a reflux, and it was held at 80° C. While stirring the 2-propanol, 1,000 grams of aluminum isopropoxide was charged into the flask to dissolve, and the mixed solution was further stirred at 80° C. for 2 hours.

Thereafter, while stirring the mixed solution at 80° C., 42.4 grams of tetraethyl orthosilicate was dropped into the flask. After dropping all of the tetraethyl orthosilicate, the mixed solution was further kept to be stirred at 80° C. for 2 hours.

Moreover, while stirring the mixed solution at 80° C., a mixed solution containing 432 grams of pure water and 2 liters of 2-propanol was dropped. The dropping rate was adjusted to 20 c.c./min. After dropping, the mixed solution was kept to be stirred at 80° C. for 2 hours.

Finally, after aging the thus mixed solution at room temperature for one day and one night, the water content and the alcohol content were removed from the mixed solution by using a rotary evaporator. After naturally drying the resulting residue, the residue was dried forcibly at 110° C., and it was calcinated at 600° C. for 3 hours. Thus, an $SiO_2$—$Al_2O_3$ composite powder was produced which had an Si/Al compositing ratio of 4/96 expressed in molar ratio.

(Coating Layer Forming)

100 parts of the composite powder, 70 parts of alumina sol containing alumina in an amount of 10 by weight, 15 parts of an aluminum nitrate aqueous solution containing aluminum nitrate in an amount of 40% by weight, and 30 parts of water were mixed, thereby preparing a slurry for coating. Then, a plurality of honeycomb support substrates formed of cordierite and having a volume of 1.7 liters were immersed into the slurry, and thereafter each of them was blown to blow away the slurry in excess. Each of the support substrates was dried at 80° C. for 20 minutes, and thereafter each of them was calcinated at 600° C. for 1 hour, thereby forming an $SiO_2$—$Al_2O_3$ coating layer thereon. The coating layer was thus coated on the honeycomb support substrate in an amount of 120 grams with respect to 1 liter of the honeycomb support substrate.

(Noble Metal Catalyst Ingredient Loading)

Each of the honeycomb support substrates having the coating layer was immersed into a platinum dinitrodiammine aqueous solution having a predetermined concentration, and thereafter it was blown to blow away the water droplets in excess. After the blowing, each of the support substrates was dried at 250° C., thereby loading Pt thereon. The loading amount of Pt was 2.0 grams with respect to 120 grams of the $SiO_2$—$Al_2O_3$ composite coating layer (or 1 liter of the honeycomb support substrate).

($NO_x$ Adsorbent Loading)

Then, each of the honeycomb support substrates with Pt loaded was Immersed into a barium acetate aqueous solution having a predetermined concentration, and it was dried at 110° C. After drying, each of them was calcinated at 600° C. for 1 hour. The loading amount of Ba was 0.3 moles with respect to 120 grams of the $SiO_2$—$Al_2O_3$ composite coating layer (or 1 liter of the honeycomb support substrate).

Fourteenth Preferred Embodiment

Except that an $SiO_2$—$Al_2O_3$ composite powder was produced which had an Si/Al compositing ratio of 10/90 expressed in molar ratio, catalysts of the Fourteenth Preferred Embodiment were prepared in the same manner as the Thirteenth Preferred Embodiment.

Fifteenth Preferred Embodiment

Except that an $SiO_2$—$Al_2O_3$ composite powder was produced which had an Si/Al compositing ratio of 20/80 expressed in molar ratio, catalysts of the Fifteenth Preferred Embodiment were prepared in the same manner as the Thirteenth Preferred Embodiment.

Sixteenth Preferred Embodiment

Except that an $SiO_2$—$Al_2O_3$ composite powder was produced which had an Si/Al compositing ratio of 35/65 expressed in molar ratio, catalysts of the Sixteenth Preferred Embodiment were prepared in the same manner as the Thirteenth Preferred Embodiment.

Seventeenth Preferred Embodiment

Except that an $SiO_2$—$Al_2O_3$ composite powder was produced which had an Si/Al compositing ratio of 50/50 expressed in molar ratio, catalysts of the Seventeenth Preferred Embodiment were prepared in the same manner as the Thirteenth Preferred Embodiment.

Eighteenth Preferred Embodiment

Except that a potassium acetate aqueous solution, instead of the barium acetate aqueous solution, was used to load K, instead of Ba, in a loading amount of 0.3 moles with respect to 120 grams of the composite powder, catalysts of the Eighteenth Preferred Embodiment were prepared in the same manner as the Thirteenth Preferred Embodiment.

Comparative Example No. 6

Except that a gamma—$Al_2O_3$ powder was used instead of the $SiO_2$—$Al_2O_3$ composite powder, catalysts of Comparative Example No. 6 were prepared in the same manner as the Thirteenth Preferred Embodiment.

Comparative Example No. 7

Except that an $SiO_2$ powder was used instead of the $SiO_2$—$Al_2O_3$ composite powder, catalysts of Comparative Example No. 7 were prepared in the same manner as the Thirteenth Preferred Embodiment.

Comparative Example No. 8

Except that a gamma—$Al_2O_3$ powder was used instead of the $SiO_2$—$Al_2O_3$ composite powder, and that a potassium acetate aqueous solution, instead of the barium acetate aqueous solution, was used to load K in a loading amount of 0.3 moles with respect to 120 grams of the composite powder, catalysts of Comparative Example No. 8 were prepared in the same manner as the Thirteenth Preferred Embodiment.

Examination and Evaluation

Each of the catalysts of the Thirteenth through Eighteenth Preferred Embodiments and Comparative Example Nos. 6 through 8 was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the catalysts for the conversion of CO, HC and $NO_x$.

After the aforementioned examination, each of the catalysts of the Thirteenth through Eighteenth Preferred Embodiments and Comparative Example Nos. 6 through 8 was subjected to a bench test on durability which utilized the same type of engine as above. Namely, each of them was disposed in an exhaust line of the engine, and then the engine was run for 50 hours while adjusting the temperature of the exhaust gas introduced into them at 650° C. at an air-fuel ratio A/F of 18. After this bench test was over, each of them was again disposed in the exhaust line of the actual vehicle. The vehicle was driven in the same manner as described above, thereby examining the catalysts for the conversion of CO, HC and $NO_x$. Note that, in order to facilitate the sulfur poisoning, the purified fuel contained sulfur in an amount of 70 ppm. The results of these examinations are summarized in the columns designated at "Initial Conversion" and "Conversion after Durability Test" in Table 3, respectively.

It is appreciated from Table 3 that, although the catalysts of the Thirteenth through Eighteenth Preferred Embodiments were inferior to those of Comparative Example Nos. 6 and 8 in terms of the initial $NO_x$ conversion, they degraded in lesser degree in terms of the $NO_x$ conversion after a durability test than those of Comparative Example Nos. 6 and 8 did%. Thus, the catalysts of the Thirteenth through Eighteenth Preferred Embodiments exhibited good durability.

When comparing the catalysts of Comparative Example No. 6 with those of Comparative Example No. 8, it is understood that the catalysts employing the gamma—$Al_2O_3$ coating layer with K loaded thereon exhibited degraded oxidation activity with respect to the catalysts employing the gamma—$Al_2O_3$ coating layer with Ba loaded. However, when comparing the catalysts of the Thirteenth Preferred Embodiment with those of the Eighteenth Preferred Embodiment, in the catalysts of the Eighteenth Preferred Embodiment in which K was loaded on the $SiO_2$—$Al_2O_3$ composite coating layer, the oxidation activity was enhanced equal to those of the Thirteenth Preferred Embodiment in which Ba was loaded on the $SiO_2$—$Al_2O_3$ composite coating layer.

In addition, it can be seen from Table 3 that the Si/Al compositing ratio preferably falls in a range of from 4/96 to 20/80, further preferably in a range of from 4/96 to 15/85.

TABLE 3

| | Coating Layer Composition (Compositing Ratio) | Pt Loading Amount (grams/liter) | NOx Adsorbent Loading (mole/liter) | Initial Conversion (%) | | | Conversion after Durability Test (%) | | |
|---|---|---|---|---|---|---|---|---|---|
| | | | | NOx | HC | CO | NOx | HC | CO |
| 13th Pref. Embodiment | $SiO_2$—$Al_2O_3$ (Si/Al = 4/96) | 2.0 | 0.3 (Ba) | 76 | 99 | 100 | 64 | 89 | 99 |
| 14th Pref. Embodiment | $SiO_2$—$Al_2O_3$ (Si/Al = 10/90) | 2.0 | 0.3 (Ba) | 62 | 99 | 100 | 56 | 90 | 98 |
| 15th Pref. Embodiment | $SiO_2$—$Al_2O_3$ (Si/Al = 20/80) | 2.0 | 0.3 (Ba) | 52 | 98 | 100 | 46 | 90 | 98 |
| 16th Pref. Embodiment | $SiO_2$—$Al_2O_3$ (Si/Al = 35/65) | 2.0 | 0.3 (Ba) | 45 | 97 | 100 | 39 | 92 | 99 |
| 17th Pref. Embodiment | $SiO_2$—$Al_2O_3$ (Si/Al = 50/50) | 2.0 | 0.3 (Ba) | 40 | 97 | 100 | 34 | 90 | 98 |
| 18th Pref. Embodiment | $SiO_2$—$Al_2O_3$ (Si/Al = 4/96) | 2.0 | 0.3 (K) | 78 | 96 | 100 | 66 | 88 | 96 |
| Comp. Ex. No. 6 | gamma-$Al_2O_3$ | 2.0 | 0.3 (Ba) | 93 | 95 | 100 | 50 | 88 | 98 |
| Comp. Ex. No. 7 | $SiO_2$ | 2.0 | 0.3 (Ba) | 20 | 94 | 100 | 16 | 90 | 96 |
| Comp. Ex. No. 8 | gamma-$Al_2O_3$ | 2.0 | 0.3 (K) | 94 | 89 | 96 | 49 | 81 | 88 |

Nineteenth Preferred Embodiment
(Preparation of $TiO_2$—$Al_2O_3$-$Sc_2O_3$ Composite Powder)

3 liters of 2-propanol was charged into a flask adapted for synthesizing sol-gel and provided with a reflux, and it was held at 80° C. While stirring the 2-propanol, 1,225 grams of aluminum isopropoxide was charged into the flask to dissolve, and the mixed solution was further stirred at 80° C. for 2 hours.

Thereafter, while stirring the mixed solution at 80° C., 568.4 grams of tetraethyl titanate was dropped into the flask. After dropping all of the tetraethyl titanate, the mixed solution was further kept to be stirred at 80° C. for 2 hours.

Moreover, while stirring the mixed solution at 80° C., a mixed solution containing 432 grams of pure water and 2 liters of 2-propanol was dropped. The dropping rate was adjusted to 20 c.c./min. After dropping, the mixed solution was kept to be stirred at 80° C. for 2 hours.

Finally, after aging the thus mixed solution at room temperature for one day and one night, the water content and the alcohol content were removed from the mixed solution by using a rotary evaporator. After naturally drying the resulting residue, the residue was dried forcibly at 110° C., and it was calcinated at 600° C. for 3 hours. Thus, a $TiO_2$—$Al_2O_3$ composite powder was produced which had a Ti/Al compositing ratio of 25/75 expressed in molar ratio.

In addition, into the $TiO_2$—$Al_2O_3$ composite powder, a scandium nitrate aqueous solution having a predetermined concentration was impregnated in a predetermined amount. The $TiO_2$—$Al_2O_3$ composite powder with scandium nitrate impregnated was dried, and thereafter it was calcinated at 600° C. for 3 hours, thereby preparing a $TiO_2$—$Al_2O_3$—$Sc_2O_3$ composite powder. 0.013 moles of $Sc_2O_3$ was included therein with respect to 120 grams of the $TiO_2$—$Al_2O_3$ composite powder.

(Coating Layer Forming)

100 parts of the composite powder, 70 parts of alumina sol containing alumina in an amount of 10% by weight, 15 parts of an aluminum nitrate aqueous solution containing aluminum nitrate in an amount of 40% by weight, and 30 parts of water were mixed, thereby preparing a slurry for coating. Then, a plurality of honeycomb support substrates formed of cordierite and having a volume of 1.7 liters were immersed into the slurry, and thereafter each of them was blown to blow away the slurry in excess. Each of the support substrates was dried at 80° C. for 20 minutes, and thereafter each of them was calcinated at 600° C. for 1 hour, thereby forming a $TiO_2$—$Al_2O_3$—$Sc_2O_3$ coating layer thereon. The coating layer was thus coated on the honeycomb support substrate in an amount of 120 grams with respect to 1 liter of the honeycomb support substrate.

(Noble Metal Catalyst Ingredient Loading)

Each of the honeycomb support substrates having the coating layer was immersed into a platinum dinitrodiammine aqueous solution having a predetermined concentration, and thereafter it was blown to blow away the water droplets in excess. After the blowing, each of the support substrates was dried at 250° C., thereby loading Pt thereon. The loading 1 amount of Pt was 2.0 grams with respect to 120 grams of the $TiO_2$—$Al_2O_3$—$Sc_2O_3$ composite coating layer (or 1 liter of the honeycomb support substrate).

($NO_x$ Adsorbent Loading)

Then, each of the honeycomb support substrates with Pt loaded was immersed into a barium acetate aqueous solution having a predetermined concentration, and it was dried at 110° C. After drying, each of them was calcinated at 600° C. for 1 hour, The loading amount of Ba was 0.3 moles with respect to 120 grams of the $TiO_2$—$Al_2O_3$—$Sc_2O_3$ composite coating layer (or 1 liter of the honeycomb support substrate).

Twentieth Preferred Embodiment

Except that an yttrium nitrate aqueous solution was used instead of the scandium nitrate aqueous solution, catalysts of the Twentieth Preferred Embodiment were prepared in the same manner as the Nineteenth Preferred Embodiment.

Twenty-first Preferred Embodiment

Except that a lanthanum nitrate aqueous solution was used instead of the scandium nitrate aqueous solution, catalysts of the Twenty-first Preferred Embodiment were prepared in the same manner as the Nineteenth Preferred Embodiment.

Twenty-second Preferred Embodiment

Except that a neodymium nitrate aqueous solution was used instead of the scandium nitrate aqueous solution, catalysts of the Twenty-second Preferred Embodiment were prepared in the same manner as the Nineteenth Preferred Embodiment.

Twenty-third Preferred Embodiment
(Preparation of $La_2O_3$—$TiO_2$—$Al_2O_3$ Composite Powder)

In a flask adapted for synthesizing sol-gel and provided with a reflux, 41.2 grams of lanthanum nitrate was dissolved into 3 liters of 2-propanol, and the resulting mixed solution was held at 80° C. While stirring the mixed solution, 1,225 grams of aluminum isopropoxide was charged into the flask to dissolve, and the mixed solution was further stirred at 80° C. for 2 hours.

Thereafter, while stirring the mixed solution at 80° C., 568.4 grams of tetraethyl titanate was dropped into the flask. After dropping all of the tetraethyl titanate, the mixed solution was further kept to be stirred at 80° C. for 2 hours.

Moreover, while stirring the mixed solution at 80C., a mixed solution containing 432 grams of pure water and 2 liters of 2-propanol was dropped. The dropping rate was adjusted to 20 c.c./min. After dropping, the mixed solution was kept to be stirred at 80° C. for 2 hours.

Finally, after aging the thus mixed solution at room temperature for one day and one night, the water content and the alcohol content were removed from the mixed solution by using a rotary evaporator. After naturally drying the resulting residue, the residue was dried forcibly at 110° C., and it was calcinated at 600° C. for 3 hours. Thus, an $La_2O_3$—$TiO_2$—$Al_2O_3$ composite powder was produced which had a Ti/Al compositing ratio of 25/75 expressed in molar ratio. In the $La_2O_3$—$TiO_2$—$Al_2O_3$ composite powder, 0.06 moles of $La_2O_3$ was included with respect to 120 grams of the $TiO_2$—$Al_2O_3$ composite powder.

Thereafter, a coating layer was formed on a plurality of honeycomb support substrates by using the thus prepared $La_2O_3$—$TiO_2$—$Al_2O_3$ composite powder, and Pt and Ba were loaded thereon in the same manner as the Nineteenth Preferred Embodiment. Catalysts of the Twenty-third Preferred Embodiment were thus prepared.

Comparative Example No. 9

Except that no scandium nitrate aqueous solution was impregnated to prepare a $TiO_2$—$Al_2O_3$ composite powder free from $Sc_2O_3$, catalysts of Comparative Example No. 9 were prepared in the same manner as the Nineteenth Preferred Embodiment.

Examination and Evaluation

Each of the catalysts of the Nineteenth through Twenty-third Preferred Embodiments and Comparative Example No.

9 was disposed in an exhaust line of an actual vehicle equipped with a gasoline engine. The gasoline engine had a displacement of 1.6 liters. The vehicle was driven so as to control the air-fuel ratio A/F at the theoretical value of 14.6, and, at the same time, to vary the temperature of the exhaust gas introduced into the catalysts at a predetermined rate. Thus, the temperature was measured at which the catalysts exhibited 50% HC conversion.

After the aforementioned examination, each of the catalysts of the Nineteenth through Twenty-third Preferred Embodiments and Comparative Example No. 9 was subjected to a bench test on durability which utilized the same type of engine as above. Namely, each of them was disposed in an exhaust line of the engine, and then the engine was run for 100 hours while adjusting the temperature of the exhaust gas introduced into them at 800° C. at the theoretical air-fuel ratio A/F of 14.6. After this bench test was over, each of them was again disposed in the exhaust line of the actual vehicle. The vehicle was driven in the same manner as described above, thereby measuring the temperature at which the catalysts exhibited 50% HC conversion. The results of these examinations are summarized in the columns designated at "Temp. at Initial 50% HC Conversion" and "Temp. at 50% HC Conversion after Durability Test" in Table 4, respectively.

Then, a plurality of honeycomb support substrates formed of cordierite and having a diameter of 30 mm and a length of 50 mm were immersed into the slurry, and thereafter each of them was blown to blow away the slurry in excess. Each of the support substrates was dried at 80° C. for 20 minutes, and thereafter each of them was calcinated at 600° C. for 1 hour, thereby forming a $TiO_2$—$Al_2O_3$ coating layer with Ce and Ba loaded. The coating layer was thus coated on the honeycomb support substrate to include alumina and titania in amounts of 120 grams and 12.2 grams, respectively, with respect to 1 liter of the honeycomb support substrate. The Ti/Al compositing ratio was 6/94 expressed in molar ratio. Each of the Ce and Ba was loaded in an amount of 0.3 moles with respect to 1 liter of the honeycomb support substrate.

Each of the honeycomb support substrates having the coating layer was immersed into a platinum dinitrodiammine aqueous solution having a predetermined concentration. After taking each of the support substrates out of the aqueous solution, it was blown to blow away the water droplets in excess. After the blowing, each of the support substrates was dried at 250° C., thereby loading Pt thereon. Moreover, each of the support substrates with Pt loaded was immersed into a rhodium nitrate aqueous solution having a predetermined concentration. After taking each of the support substrates out of the aqueous solution, it was blown to

TABLE 4

|  | Coating Layer Composition | Pt Loading Amount (grams/liter) | Ba Loading Amount (mole/liter) | Temp. (° C.) Initial 50% HC Conversion | Temp. (° C.) at 50% HC Conversion after Durability Test |
| --- | --- | --- | --- | --- | --- |
| 19th Pref. Embodiment | $TiO_2$—$Al_2O_3$—$Sc_2O_3$ | 2.0 | 0.3 | 274 | 336 |
| 20th Pref. Embodiment | $TiO_2$—$Al_2O_3$—$Y_2O_3$ | 2.0 | 0.3 | 275 | 334 |
| 21st Pref. Embodiment | $TiO_2$—$Al_2O_3$—$La_2O_3$ | 2.0 | 0.3 | 274 | 330 |
| 22nd Pref. Embodiment | $TiO_2$—$Al_2O_3$—$Nd_2O_3$ | 2.0 | 0.3 | 273 | 332 |
| 23rd Pref. Embodiment | $La_2O_3$—$TiO_2$—$Al_2O_3$ | 2.0 | 0.3 | 270 | 326 |
| Comp. Ex. No. 9 | $TiO_2$—$Al_2O_3$ | 2.0 | 0.3 | 276 | 366 |

It is appreciated from Table 4 that the catalysts of the Nineteenth through Twenty-third Preferred Embodiments degraded in lesser degree in terms of the oxidation activity after a durability test than those of Comparative Example No. 9 did. Thus, the catalysts of the Nineteenth through Twenty-third Preferred Embodiments were found to be improved in durability. Especially, like the catalysts of the Twenty-third Preferred Embodiment, when the compositing of the coating layer is carried out in a highly dispersed state during the sol-gel synthesizing step, it was found that the resulting catalysts are superior to the catalysts of the Twenty-first Preferred Embodiment in which the compositing of La was carried out after the sol-gel synthesizing step.

Note that, however, the exhaust-gases-purifying catalysts of the Nineteenth through Twenty-third Preferred Embodiments as well as those of Comparative Example No. 9 exhibited $NO_x$ purifying performance equivalent to the $NO_x$ purifying performance exhibited by the exhaust-gases-purifying catalysts of the Second Preferred Embodiment.

Twenty-fourth Preferred Embodiment 110 parts of an active alumina powder, 50 parts of a cerium oxide powder, 10 parts of a pseudo-boehmite powder, 40.7 parts of titania sol containing titania in an amount of 30% by weight, 200 parts of water, and 60 parts of a barium carbonate powder were mixed, thereby preparing a slurry for coating.

blow away the water droplets in excess. After the blowing, each of the support substrates was dried at 250° C., thereby loading Rh thereon. The loading amounts of Pt and Rh were 2.0 grams and 0.1 grams, respectively, with respect to 132.2 grams of the $TiO_2$—$Al_2O_3$ composite (or 1 liter of the honeycomb support substrate).

Twenty-fifth Preferred Embodiment

Except that 110 parts of an active alumina powder, 50 parts of a cerium oxide powder, 10 parts of a pseudo-boehmite powder, 12.2 parts of a titania powder, 200 parts of water, and 60 parts of a barium carbonate powder were mixed to prepare a slurry for coating, catalysts of the Twenty-fifth Preferred Embodiment were prepared in the same manner as the Twenty-fourth Preferred Embodiment, and they had an identical composition thereto.

Twenty-sixth Preferred Embodiment

When preparing catalysts of the Twenty-sixth Preferred Embodiment, 110 parts of an active alumina powder, 10 parts of a pseudo-boehmite powder, 40.7 parts of titania sol containing 30% by weight of titania, and 200 parts of water were mixed to prepare a slurry for coating. The slurry was coated on each of the honeycomb support substrates in the same manner as the Twenty-fourth Preferred Embodiment. The coating layer was thus coated on the honeycomb support substrate to include alumina and titania in amounts of 120 grams and 12.2 grams, respectively, with respect to 1 liter of the honeycomb support substrate. The Ti/Al compositing ratio was 6/94 expressed in molar ratio.

Each of the honeycomb support substrates having the coating layer was immersed into a cerium nitrate aqueous solution having a predetermined concentration. After taking each of the support substrates out of the aqueous solution, it was blown to blow away the water droplets in excess. After the blowing, each of the support substrates was dried at 250° C., thereby loading Ce thereon. Further, each of the support substrates with Ce loaded was immersed into a platinum dinitrodiammine aqueous solution having a predetermined concentration. After taking each of the support substrates out of the aqueous solution, it was blown to blow away the water droplets in excess. After the blowing, each of the support substrates was dried at 250° C., thereby loading Pt thereon. Furthermore, each of the support substrates with Ce and Pt loaded was immersed into a rhodium nitrate aqueous solution having a predetermined concentration. After taking each of the support substrates out of the aqueous solution, it was blown to blow away the water droplets in excess. After the blowing, each of the support substrates was dried at 250° C., thereby loading Rh thereon. The loading amounts of Pt and Rh were 2.0 grams and 0.1 grams, respectively, with respect to 132.2 grams of the TiO$_2$—Al$_2$O$_3$ composite (or 1 liter of the honeycomb support substrate).

Finally, each of the support substrates with Ce, Pt and Rh loaded was immersed into a barium acetate aqueous solution having a predetermined concentration. After taking each of the support substrates out of the aqueous solution, it was blown to blow away the water droplets in excess. After the blowing, each of the support substrates was dried at 250° C., thereby loading Ba thereon. The loading amounts of Ce and Ba were identical to those of the Twenty-fourth Preferred Embodiment.

Twenty-seventh through Thirty-first Preferred Embodiments The catalysts of the Twenty-fourth Preferred Embodiment were further immersed into an alkali metal compound aqueous solution or an alkaline-earth metal compound aqueous solution having a predetermined concentration. After taking each of the support substrates out of the aqueous solution, it was blown to blow away the water droplets in excess. After the blowing, each of the support substrates was dried at 250° C., and it was calcinated at 500° C. for 1 hour. Thus, as set forth in Table 6 below, the alkali metals and the alkaline-earth metals other than Ba were loaded on the support substrates in amounts of 0.1 mole, respectively, with respect to 1 liter of the support substrates, thereby preparing catalysts of the Twenty-seventh through Thirty-first Preferred Embodiments.

Thirty-second Preferred Embodiment

Except that 90 parts of an active alumina powder, 50 parts of a cerium oxide powder, 10 parts of a pseudo-boehmite powder, 30 parts of a titania powder, 200 parts of water, and 60 parts of a barium carbonate powder were mixed to prepare a slurry for coating, catalysts of the Thirty-second Preferred Embodiment were prepared in the same manner as the Twenty-fourth Preferred Embodiment.

In the catalysts of the Thirty-second Preferred Embodiment, the coating layer was thus coated on the honeycomb support substrate to include alumina and titania in amounts of 90 grams and 30 grams, respectively, with respect to 1 liter of the honeycomb support substrate, and the Ti/Al compositing ratio was 7/32 expressed in molar ratio. The Ce and Ba were loaded in amounts of 0.3 moles, respectively, with respect to 1 liter of the honeycomb support substrate. The Pt and Rh were loaded in amounts of 2.0 grams and 0.1 grams, respectively, with respect to 1 liter of the honeycomb support substrate.

Thirty-third Preferred Embodiment

Except that a palladium nitrate aqueous solution was used instead of the platinum dinitrodiammine aqueous solution, and each of the honeycomb support substrates was dried at 80° C. to load Pd, instead of Pt, in an amount of 10 grams with respect to 1 liter of the honeycomb support substrate, catalysts of the Thirty-third Preferred Embodiment were prepared in the same manner as the Twenty-fourth Preferred Embodiment.

Comparative Example No. 10

Except that 110 parts of an active alumina powder, 50 parts of a cerium oxide powder, 10 parts of a pseudo-boehmite powder, 40.7 parts of alumina sol containing alumina in an amount of 30% by weight, 200 parts of water, and 60 parts of a barium carbonate powder were mixed to prepare a slurry for coating, and the coating layer was coated to include alumina in amount of 120 grams with respect to 1 liter of the honeycomb support substrate, catalysts of Comparative Example No. 10 were prepared in the same manner as the Twenty-fourth Preferred Embodiment. Their composition is detailed in Table 6.

Comparative Example No. 11

Except that 110 parts of an active alumina powder, 50 parts of a cerium oxide powder, 10 parts of a pseudo-boehmite powder, 12.2 parts of alumina sol containing alumina in an amount of 30% by weight, 200 parts of water, and 60 parts of a barium carbonate powder were mixed to prepare a slurry for coating, and the coating layer was coated to include alumina in amount of 120 grams with respect to 1 liter of the honeycomb support substrate, catalysts of Comparative Example No. 11 were prepared in the same manner as the Twenty-fourth Preferred Embodiment. Their composition is detailed in Table 6.

Comparative Example No. 12

Except that 110 parts of an active alumina powder, 50 parts of a cerium oxide powder, 10 parts of a pseudo-boehmite powder, 40.7 parts of titania sol containing titania in an amount of 30% by weight and 200 parts of water, but free from a barium carbonate powder, were mixed to prepare a slurry for coating, catalysts of Comparative Example No. 12 were prepared in the same manner as the Twenty-fourth Preferred Embodiment. Their composition is detailed in Table 6.

Examination and Evaluation

Each of the catalysts of the Twenty-fourth through Thirty-third Preferred Embodiments and Comparative Example Nos. 10 through 12 was examined for its performance by using model gases. As recited in in Table 5 below, 3 model gases were used to degrade the catalysts, and 2 model gases were used to evaluate the performance of the catalysts. The model gases had the compositions set forth in Table 5. Specifically, each of the catalysts was treated with the model gas equivalent to an A/F ratio of 18 for degrading at 800° C. for 5 hours. Moreover, at 500° C., each of them was treated alternately with the model gas equivalent to an A/F ratio of 22 for degrading for 4 minutes, and with the model gas equivalent to an A/F ratio of 14.5 for degrading for 1 minute. This alternating cycle was repeated for 10 hours, thereby carrying out a durability test. During this durability test, the flow of the model gases was adjusted to 1 liter/min., and each of the catalysts was thus forcibly exposed to $SO_2$.

Then, into each of the catalysts subjected to the durability test, the model gas equivalent to an A/F ratio of 22 for evaluating and the model gas equivalent to an A/F ratio of 14.5 for evaluating were alternately flowed at 350° C. for 2 minutes. This alternating cycle was repeated for 5 times. When the model gas equivalent to an A/F ratio of 22 for evaluating was flowed, each of the catalysts was examined for average $NO_x$, CO and HC conversions after a durability test. The results of this examination are also summarized in Table 6.

and Ba was further composited with the $TiO_2$—$Al_2O_3$ composite.

On the other hand, in the catalysts of Comparative Example Nos. 10 and 11, the coating layer was formed of the simple $Al_2O_3$. Even if Ce was composited with $Al_2O_3$ to form an $Al_2O_3$—$CeO_2$ composite, the composite does not satisfy the limitation of the present invention recited in the accompanying claims. That is, the catalysts of Comparative Example Nos. 10 and 11 adsorbed the $SO_x$, and they exhibited the deteriorated $NO_x$ conversion after a durability test.

In addition, in the catalysts of Comparative Example No. 12, although the coating layer was formed of the $TiO_2$—$Al_2O_3$ composite, no $NO_x$ adsorbent was loaded thereon.

TABLE 5

| | A/F Ratio | NO | CO | $C_3H_6$ | $O_2$ | $H_2$ | $SO_2$ | $H_2O$ | $N_2$ |
|---|---|---|---|---|---|---|---|---|---|
| For Degrading | 18 | — | 0.1 | 0.06 | 4 | — | 0.05 | 6 | balance |
| For Degrading | 22 | — | 0.1 | 0.12 | 6 | — | 0.05 | 6 | balance |
| For Degrading | 14.5 | — | 0.6 | 0.04 | 0.3 | 0.2 | 0.05 | 6 | balance |
| For Evaluating | 22 | 0.05 | 0.1 | 0.12 | 6 | — | 2 ppm | 6 | balance |
| For Evaluating | 14.5 | 0.12 | 0.6 | 0.04 | 0.3 | 0.2 | 2 ppm | 6 | balance |

(Note) Unless otherwise specified, the unit is %.

TABLE 6

| | Coating Layer Composition (Ti/Al Compositing Ratio) | Ti Addition Form | Noble Metal Catalyst Ingredient Loading Amount (gram/liter) | | | | | NOx Adsorbent Loading Amount (mole/liter) | | | | | Conversion after Durability Test (%) | | |
|---|---|---|---|---|---|---|---|---|---|---|---|---|---|---|---|
| | | | Pt | Pd | Rh | Ce | Ba | La | Sr | Li | K | Cs | HC | CO | NOx |
| 24th Pref. Embodiment | $TiO_2$—$Al_2O_3$ (6/94) | Sol | 2 | — | 0.1 | 0.3 | 0.3 | — | — | — | — | — | 55 | 97 | 93 |
| 25th Pref. Embodiment | $TiO_2$—$Al_2O_3$ (6/94) | Powder | 2 | — | 0.1 | 0.3 | 0.3 | — | — | — | — | — | 54 | 96 | 94 |
| 26th Pref. Embodiment | $TiO_2$—$Al_2O_3$ (6/94) | Sol | 2 | — | 0.1 | 0.3 | 0.3 | — | — | — | — | — | 55 | 96 | 93 |
| 27th Pref. Embodiment | $TiO_2$—$Al_2O_3$ (6/94) | Sol | 2 | — | 0.1 | 0.3 | 0.3 | 0.1 | — | — | — | — | 56 | 97 | 94 |
| 28th Pref. Embodiment | $TiO_2$—$Al_2O_3$ (6/94) | Sol | 2 | — | 0.1 | 0.3 | 0.3 | — | 0.1 | — | — | — | 54 | 96 | 94 |
| 29th Pref. Embodiment | $TiO_2$—$Al_2O_3$ (6/94) | Sol | 2 | — | 0.1 | 0.3 | 0.3 | — | — | 0.1 | — | — | 52 | 95 | 94 |
| 30th Pref. Embodiment | $TiO_2$—$Al_2O_3$ (6/94) | Sol | 2 | — | 0.1 | 0.3 | 0.3 | — | — | — | 0.1 | — | 53 | 95 | 91 |
| 31st Pref. Embodiment | $TiO_2$—$Al_2O_3$ (6/94) | Sol | 2 | — | 0.1 | 0.3 | 0.3 | — | — | — | — | 0.1 | 56 | 94 | 89 |
| 32nd Pref. Embodiment | $TiO_2$—$Al_2O_3$ (7/32) | Powder | 2 | — | 0.1 | 0.3 | 0.3 | — | — | — | — | — | 57 | 96 | 92 |
| 33rd Pref. Embodiment | $TiO_2$—$Al_2O_3$ (6/94) | Sol | — | 10 | 0.2 | 0.3 | 0.3 | — | — | — | — | — | 52 | 95 | 95 |
| Comp. Ex. No. 10 | $Al_2O_3$ | — | 2 | — | 0.1 | 0.3 | 0.3 | — | — | — | — | — | 44 | 95 | 93 |
| Comp. Ex. No. 11 | $Al_2O_3$ | — | 2 | — | 0.1 | 0.3 | 0.3 | — | — | — | — | — | 43 | 95 | 93 |
| Comp. Ex. No. 12 | $TiO_2$—$Al_2O_3$ (6/94) | Sol | 2 | — | 0.1 | 0.3 | — | — | — | — | — | — | 35 | 96 | 95 |

In the catalysts of the Twenty-fourth through Thirty-third Preferred Embodiments, since the coating layer was formed of the $TiO_2$—$Al_2O_3$ composite, they exhibited the high $NO_x$ conversion of more than 50% even after a durability test. Moreover, in the catalysts of the Twenty-fourth, Twenty-fifth, Thirty-second and Thirty-third Preferred Embodiments, there was possibility that at least one of Ce Thus, they exhibited the considerably degraded $NO_x$ conversion after a durability test.

In particular, it is appreciated from the catalysts of the Twenty-fourth through Thirty-third Preferred Embodiments revealed that the composite support according to the present invention can be formed not only by the sol-gel process but also by mixing and calcinating a powder and sol or by mixing and calcinating powders.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying exhaust gases, comprising:
    a support comprising a $TiO_2$—$Al_2O_3$ composite wherein the composite is at an atomic level;
    an $NO_x$ adsorbent including at least one member selected from the group consisting of alkali metals, alkaline-earth metals and rare-earth elements; and loaded on said support; and
    a noble metal catalyst ingredient loaded on said support, wherein said $TiO_2$—$Al_2O_3$ composite satisfies the following compositing ratio, defined by moles of metallic components of $TiO_2$ and $Al_2O_3$, of $TiO_2$ with respect to $Al_2O_3$;
    Ti/Al=20/80 through 30/70.

2. The catalyst according to claim 1, wherein said $NO_x$ adsorbent is at least one alkali metal selected from the group consisting of lithium (Li), sodium (Na), potassium (K), rubidium (Rb), cesium (Cs) and francium (Fr).

3. The catalyst according to claim 1, wherein said $NO_x$ adsorbent is at least one alkaline-earth metal selected from the group consisting of barium (Ba), beryllium (Be), magnesium (Mg), calcium (Ca) and strontium (Sr).

4. The catalyst according to claim 1, wherein said $NO_x$ adsorbent is at least one rare-earth element selected from the group consisting of scandium (So), yttrium (Y), lanthanum (La), cerium (Ce), praseodymium (Pr) and neodymium (Nb).

5. The catalyst according to claim 1, wherein said $NO_x$ adsorbent is loaded in an amount which is effective to adsorb nitrogen oxide ($NO_x$) in exhaust gases whose oxygen concentrations are at the stoichiometric point or more than required for oxidizing carbon monoxide (CO) and hydrocarbons (HC).

6. The catalyst according to claim 5, wherein said $NO_x$ adsorbent is loaded in amount of from 0.05 to 1.0 mole with respect to 120 grams of said support.

7. The catalyst according to claim 1, wherein said noble metal catalyst ingredient is at least one element selected from the group consisting of Pt, Rh and Pd.

8. The catalyst according to claim 1, wherein said noble metal catalyst ingredient is loaded in an amount which is effective to purify $NO_x$, CO and HC in exhaust gases whose oxygen concentrations are at the stoichiometric point or more than required for oxidizing CO and HC.

9. The catalyst according to claim 8, wherein said noble metal catalyst ingredient is at least one element selected from the group consisting of Pt and Pd, and loaded in an amount of from 0.1 to 20.0 grams with respect to 120 grams of said support.

10. The catalyst according to claim 9, wherein said noble metal catalyst ingredient is loaded in an amount of from 0.5 to 10.0 grams with respect thereto.

11. The catalyst according to claim 8, wherein said noble metal catalyst ingredient is Rh, and loaded in an amount of from 0.01 to 80.0 grams with respect to 120 grams of said support.

12. The catalyst according to claim 11, wherein said noble metal catalyst ingredient is loaded in an amount of from 0.05 to 5.0 grams with respect thereto.

13. The catalyst according to claim 1, wherein the $NO_x$ adsorbent and the noble catalyst ingredient loaded on the support are loaded by impregnation.

14. A catalyst for purifying exhaust gases, comprising:
    a composite support including $TiO_2$, $Al_2O_3$ and at least one alloy selected from the group consisting of alkaline-earth metals and rare-earth elements, wherein the composite is at an atomic level;
    an $NO_x$ adsorbent including at least one member selected from the group consisting of alkaline metals, alkaline-earth metals and rare-earth elements, and loaded on said composite support; and
    a noble metal catalyst ingredient loaded on said composite support, wherein said composite satisfies the following compositing ratio, defined by moles of metallic components of $TiO_2$ and $Al_2O_3$, of $TiO_2$ with respect to $Al_2O_3$;
    Ti/Al=20/80 through 50/50.

15. The catalyst according to claim 14, wherein said $NO_x$ adsorbent is at least one alkali metal selected from the group consisting of lithium (Li), sodium (Na), potassium (K), rubidium (Rb), cesium (Cs) and francium (Fr).

16. The catalyst according to claim 14, wherein said NO adsorbent is at least one alkaline-earth metal selected from the group consisting of barium (Ba), beryllium (Be), magnesium (Mg), calcium (Ca) and strontium (Sr).

17. The catalyst according to claim 14, wherein said $NO_x$ adsorbent is at least one rare-earth element selected from the group consisting of scandium (So), yttrium (Y), lanthanum (La), cerium (Ce), praseodymium (Pr) and neodymium (Nb).

18. The catalyst according to claim 14, wherein said $NO_x$ adsorbent is loaded in an amount which is effective to adsorb nitrogen oxide ($NO_x$) in exhaust gases whose oxygen concentrations are at the stoichiometric point or more than required for oxidizing carbon monoxide (CO) and hydrocarbons (HC).

19. The catalyst according to claim 18, wherein said $NO_x$ adsorbent is loaded in amount of from 0.05 to 1.0 mole with respect to 120 grams of said composite support.

20. The catalyst according to claim 14, wherein said noble metal catalyst ingredient is at least one element selected from the group consisting of Pt, Rh and Pd.

21. The catalyst according to claim 14, wherein said noble metal catalyst ingredient is loaded in an amount which is effective to purify $NO_x$, CO and HC in exhaust gases whose oxygen concentrations are at the stoichiometric point or more that required for oxidizing CO and HC.

22. The catalyst according to claim 21, wherein said noble metal catalyst ingredient is at least one element selected from the group consisting of Pt and Pd, and loaded in an amount of from 0.1 to 20.0 grams with respect to 120 grams of said composite support.

23. The catalyst according to claim 22, wherein said noble metal catalyst ingredient is loaded in an amount of from 0.5 to 10.0 grams with respect thereto.

24. The catalyst according to claim 21, wherein said noble metal catalyst ingredient is Rh, and loaded in an amount of from 0.01 to 80.0 grams with respect to 120 grams of said composite support.

25. The catalyst according to claim 24, wherein said noble metal catalyst ingredient is loaded in an amount of from 0.05 to 5.0 grams with respect thereto.

26. A catalyst for purifying exhaust gases, comprising:
    a support comprising a $ZrO_2$—$Al_2O_3$ composite wherein the composite is at an atomic level,
    an $NO_x$ adsorbent including at least one member selected from the group consisting of alkali metals, alkaline-earth metals and rare-earth elements, and loaded on said support, and a noble metal catalyst ingredient loaded on said support, wherein said $ZrO_2$—$Al_2O_3$ composite satisfies the following compositing ratio, defined by moles of metallic components of $ZrO_2$ and $Al_2O_3$, of $ZrO_2$ with respect to $Al_2O_3$:

Zr/Al=20/80 through 50/50.

27. The catalyst according to claim 26, wherein said $NO_x$ adsorbent is at least one alkali metal selected from the group consisting of lithium (Li), sodium (Na), potassium (K), rubidium (Rb), cesium (Cs) and francium (Fr).

28. The catalyst according to claim 26, wherein said $NO_x$ adsorbent is at least one alkaline-earth metal selected from the group consisting of barium (Ba), beryllium (Be), magnesium (Mg), calcium (Ca) and strontium (Sr).

29. The catalyst according to claim 26, wherein said $NO_x$ adsorbent is at least one rare-earth element selected from the group consisting of scandium (Sc), yttrium (Y), lanthanum (La), cerium (Ce), praseodymium (Pr) and neodymium (Nb).

30. The catalyst according to claim 26, wherein said $NO_x$ adsorbent is loaded in an amount which is effective to adsorb nitrogen oxide (NO) in exhaust gases whose oxygen concentrations are at a stoichiometric point or more than required for oxidizing carbon monoxide (CO) and hydrocarbons (HC).

31. The catalyst according to claim 30, wherein said $NO_x$, adsorbent is loaded in amount of from 0.05 to 1.0 role with respect to 120 grams of said support.

32. The catalyst according to claim 26, wherein said noble metal catalyst ingredient is at least one element selected from the group consisting of Pd, Rh and Pt.

33. The catalyst according to claim 26, wherein said noble metal catalyst ingredient is loaded in an amount which is effective to purify $NO_x$, CO and HC in exhaust gases whose oxygen concentrations are at the stoichiometric point or more than required for oxidizing CO and HC.

34. The catalyst according to claim 33, wherein said noble metal catalyst ingredient is at least one element selected from the group consisting of Pd and Pt, and loaded an amount of from 0.05 to 20.0 grams with respect to 120 grams of said support.

35. The catalyst according to claim 34, wherein said noble metal catalyst ingredient is load ed in an amount of from 0.5 to 10.0 grams with respect to 120 grams of said support.

36. The catalyst according to claim 34, wherein said noble metal catalyst ingredient is loaded in an amount of from 0.05 to 5.0 grams with respect to 120 grams of said support.

37. The catalyst according to claim 33, wherein said noble metal catalyst ingredient is Rh, and loaded in an amount of from 0.01 to 80.0 grams with respect to 120 grams of said support.

38. A catalyst for purifying exhaust gases, comprising:

a support comprising a $SiO_2$—$Al_2O_3$ composite wherein the composite is at an atomic level, an $NO_x$ adsorbent including at least one member selected from the group consisting of alkali metals, alkaline-earth metals and rare-earth elements, and loaded on said support, and a noble metal catalyst ingredient loaded on said support, wherein said $SiO_2$—$Al_2O_3$ composite satisfies the following compositing ratio, defined by moles of metallic components of $SiO_2$ and $Al_2O_3$, of $SiO_2$ with respect to $Al_2O_3$:

Si/Al=4/96 through 20/80.

39. The catalyst according to claim 38, wherein said $NO_x$ adsorbent is at least one alkali metal selected from the group consisting of lithium (Li), sodium (Na), potassium (K), rubidium (Rb), cesium (Cs) and francium (Fr).

40. The catalyst according to claim 38, wherein said $NO_x$ adsorbent is at least one alkaline-earth metal selected from the group consisting of barium (Ba), beryllium (Be), magnesium (Mg), calcium (Ca) and strontium (Sr).

41. The catalyst according to claim 38, wherein said $NO_x$ adsorbent is at least one rare-earth element selected from the group consisting of scandium (Sc), yttrium (Y), lanthanum (La), cerium (Ce), praseodymium (Pr) and neodymium (Nb).

42. The catalyst according to claim 38, wherein said $NO_x$ adsorbent is loaded in an amount which is effective to adsorb nitrogen oxide ($NO_x$) in exhaust gases whose oxygen concentrations are at a stoichiometric point or more than required for oxidizing carbon monoxide (CO) and hydrocarbons (HC).

43. The catalyst according to claim 42, wherein said $NO_x$ adsorbent is loaded in amount of from 0.05 to 1.0 mole with respect to 120 grams of said support.

44. The catalyst according to claim 38, wherein said noble metal catalyst ingredient is at least one element selected from the group consisting of Pd, Rh and Pt.

45. The catalyst according to claim 38, wherein said noble metal catalyst ingredient is loaded in an amount which is effective to purify $NO_x$, CO and HC in exhaust gases whose oxygen concentrations are at a stoichiometric point or more than required for oxidizing CO and HC.

46. The catalyst according to claim 45, wherein said noble metal catalyst ingredient is at least one element selected from the group consisting of Pd and Pt, and loaded in an amount of from 0.1 to 20.0 grams with respect to 120 grams of said support.

47. The catalyst according to claim 46, wherein said noble metal catalyst ingredient is loaded in an amount of from 0.5 to 10.0 grams with respect to 120 grams of said support.

48. The catalyst according to claim 47, wherein said noble metal catalyst ingredient is loaded in an amount of from 0.05 to 5.0 grams with respect to 120 grams of said support.

49. The catalyst according to claim 45, wherein said noble metal catalyst ingredient is Rh, and loaded in an amount of from 0.01 to 80.0 grams with respect to 120 grams of said support.

* * * * *